(12) United States Patent
Catabia

(10) Patent No.: US 7,427,942 B2
(45) Date of Patent: Sep. 23, 2008

(54) NOISE-RIDING VIDEO SIGNAL THRESHOLD GENERATION SCHEME FOR A PLURALITY OF VIDEO SIGNAL CHANNELS

(75) Inventor: Derek J. Catabia, South Dartmouth, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 109 days.

(21) Appl. No.: 11/706,682

(22) Filed: Feb. 12, 2007

(65) Prior Publication Data

US 2008/0191911 A1    Aug. 14, 2008

(51) Int. Cl.
*G01S 7/292* (2006.01)
(52) U.S. Cl. .......................... 342/13; 342/197
(58) Field of Classification Search ............. 342/13–20, 342/89–91, 192, 195–197
See application file for complete search history.

(56) References Cited

U.S. PATENT DOCUMENTS

| 4,194,206 | A | * | 3/1980 | Tsui et al. ...................... 342/13 |
| 4,336,541 | A | * | 6/1982 | Tsui et al. ...................... 342/13 |
| 4,426,648 | A | * | 1/1984 | Tsui et al. ...................... 342/20 |
| 4,885,586 | A | * | 12/1989 | Hoover et al. .................. 342/13 |
| 5,550,546 | A | * | 8/1996 | Noneman et al. ............. 342/13 |
| 5,574,360 | A | * | 11/1996 | Richardson ............... 324/76.39 |
| 6,177,902 | B1 | * | 1/2001 | Huntley et al. ................ 342/20 |
| 6,696,898 | B1 | * | 2/2004 | Ward et al. ............. 331/116 FE |
| 2004/0160286 | A1 | * | 8/2004 | Ward et al. ................... 331/185 |

FOREIGN PATENT DOCUMENTS

JP          5922276 A  * 12/1984
JP         05281344 A  * 10/1993

* cited by examiner

*Primary Examiner*—John B Sotomayor
(74) *Attorney, Agent, or Firm*—James M. Kasischke; Michael P. Stanley; Jean-Paul A. Nasser

(57) ABSTRACT

An apparatus for adaptively generating video signal thresholds for a comparator circuit having a plurality of signal channels. The apparatus has input circuitry in electrical signal communication with the plurality of signal channels. The input circuitry uses a selector circuit to select one signal channel of the plurality of signal channels for processing. The apparatus also has a processing resource having an input joined to process the electrical signals on the selected one signal channel to determine if a video signal is present and, if no video signal is present, to process noise signals on the selected one signal channel to generate a new video signal threshold. The processing resource has an output to provide the new video signal threshold to the comparator circuit corresponding to the selected signal channel.

16 Claims, 1 Drawing Sheet

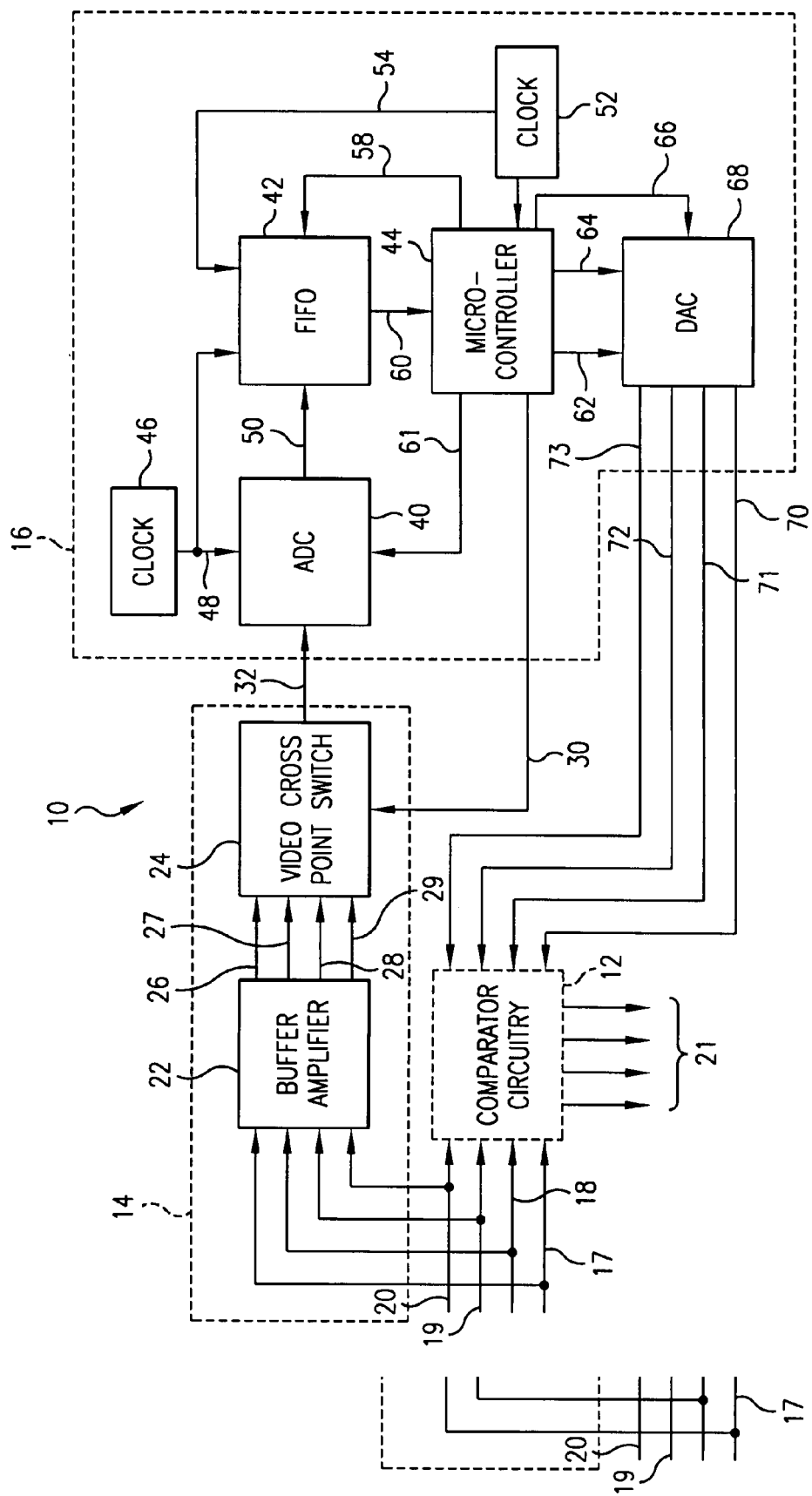

NOISE-RIDING VIDEO SIGNAL THRESHOLD GENERATION SCHEME FOR A PLURALITY OF VIDEO SIGNAL CHANNELS

STATEMENT OF GOVERNMENT INTEREST

The invention described herein may be manufactured and used by or for the Government of the United States of America for Governmental purposes without payment of any royalties thereon or therefore.

BACKGROUND OF THE INVENTION (1) Field of the Invention

The present invention generally relates to a noise-riding video signal threshold generation apparatus and method.

(2) Description of the Prior Art

Electronic warfare receivers, such as crystal video receivers, are used to detect radio frequency (RF) energy in the environment. Typically, the RF energy is collected by an antenna, amplified and then fed into the receiver wherein it is routed to a video detector. The video detector converts the RF energy to a video signal that has a level that is proportionate to the RF signal strength. The video signal is amplified and processed by the receiver to alert the operator of the presence of any RF energy in the environment. Detection of the video is typically accomplished by using a comparator to determine if the video signal exceeds a set threshold. The threshold level is critical to proper operation of the receiver. A threshold set too high degrades the receiver's sensitivity, and the receiver is unable to process weaker signals. On the other hand, if the threshold is set too low, the system noise will exceed the threshold causing the receiver to produce false alarms. Due to temperature changes, noise levels can fluctuate in the system. If a fixed threshold is used, the changing noise levels can produce false alarms or can desensitize the receiver.

Many prior art systems utilize analog systems to filter, invert and rectify the incoming RF signal to separate the noise component from the video signal and generate a video threshold. A review of the prior art reveals several references that disclose a variety of circuits and systems for adaptively generating a video signal threshold.

Phipps et al., U.S. Pat. No. 4,274,095 discloses a radar video converter that uses a computer interface module to select from a plurality of threshold levels for use in detecting radar signals corresponding to targets in a particular radar environment.

Cantwell et al., U.S. Pat. No. 5,091,729 discloses an adaptive threshold detector system that adaptively uses three threshold criteria to detect weak and strong valid signals. The system uses an integrating sum of the detected signal envelope as detection criteria to distinguish between weak and strong signals and to adjust the system detection criteria accordingly.

Lee, U.S. Pat. No. 5,254,999 discloses a video signal processor for a radar system that comprises an A/D converting circuit that converts the radar signals into digital signals, and a cell averaging circuit. The cell averaging circuit adaptively sets a threshold value for determining whether a signal is target data or not. This patent refers to this technique of adaptively setting the threshold value as cell averaging.

Boria, U.S. Pat. No. 6,433,730 discloses a radar receiver that comprises a noise riding threshold circuit that comprises high frequency components of the noise and video signal to produce noise riding threshold voltage.

Based on the aforesaid prior art references, a need still exists for an improved apparatus that adaptively generates video signal thresholds.

SUMMARY OF THE INVENTION

It is therefore a primary object and general purpose of the present invention to provide a noise-riding video signal threshold generation apparatus for adaptively generating video signal thresholds for use by comparator circuitry in video receivers or other video processing equipment.

It is a further object of the present invention to select and monitor each one of a plurality of video signal channels in order to determine if a new video signal threshold is to be generated for use by the comparator circuitry that corresponds to the selected video signal channel.

To attain the objects of the present invention, an apparatus is provided for adaptively generating video signal thresholds for a comparator circuit having a plurality of signal channels. The apparatus includes input circuitry in electrical signal communication with the plurality of signal channels. Each signal channel carries electrical signals comprising video and noise signals. The input circuitry comprises a selector circuit to select one signal channel of the plurality of signal channels for processing. The apparatus also has a processing resource to process the electrical signals on the selected video channel to determine if a video signal is present and, if no video signal is present, to process noise signals on the selected signal channel to generate a new video signal threshold and provide the new video signal threshold to the comparator circuit corresponding to the selected signal channel.

It is another object of the present invention to provide a method for adaptively generating video signal thresholds comprising the steps of providing a plurality of signal channels that carry electrical signals comprising video and noise signals, selecting one of the signal channels, processing the electrical signals on the selected signal channel to determine if a video signal is present and if no video signal is present, then the noise signals on the selected signal channel are processed to generate a new video signal threshold. After the new video signal threshold is generated for the selected signal channel, a next signal channel is selected and the processing steps are repeated for that next signal channel. The sequential selection and processing of each signal channel is continuous. Thus, the signal channels are continuously monitored and, if necessary, new video signal thresholds are generated.

Other objects, features and advantages of the present invention will be apparent from the ensuing description and accompanying drawings.

BRIEF DESCRIPTION OF THE DRAWINGS

The invention itself, both as to organization and method of operation, may best be understood by reference to the detailed description which follows taken in conjunction with the accompanying drawings in which:

The FIGURE is a schematic diagram of the apparatus of the present invention.

DETAILED DESCRIPTION OF THE INVENTION

Referring now to the FIGURE, there is shown a schematic diagram of apparatus 10 of the present invention. Apparatus 10 adaptively generates video signal thresholds for multiple video signal channels used by comparator circuit 12 which is part of receiver system or other video signal processing equipment. Apparatus 10 generally comprises input circuit 14 and processing resource 16. A plurality of signal channels 17, 18, 19 and 20 are provided to comparator circuit 12 and input circuit 14. Each of these signal channels carries electrical signals comprising video signals and noise signals. Although four signal channels 17, 18, 19, and 20 are shown, it is to be understood that this is just an example and that apparatus 10 can operate with other quantities of video signal channels.

Comparator circuit 12 compares the video signal on each signal channel 17, 18, 19 and 20 to a separate threshold voltage. If the video signal on each channel exceeds the corresponding threshold level, the comparator circuit 12 routes that video signal to other processing components (not shown) via one of the output signal channels, generally indicated by reference number 21. Thus, in this embodiment, comparator circuit 12 comprises separate comparator circuits (not shown) wherein each comparator circuit uses a separate threshold voltages, one for each signal channel 17, 18, 19, and 20.

in a preferred embodiment, input circuit 14 comprises buffer amplifier 22 and video cross point switch 24. Signal channels 17, 18, 19, and 20 are connected to the inputs of buffer amplifier 22. Buffer amplifier 22 has outputs channels 26, 27, 28 and 29 that correspond to signal channels 17, 18, 19 and 20, respectively. Output channels 26, 27, 28 and 29 are inputted into video cross point switch 24. Processing resource 16 outputs channel select signal 30 that is inputted into video cross point switch 24. Channel select signal 30 is a digital signal that defines a code or address that represents a desired signal channel. Upon receiving signal channel select signal 30, video cross point switch 24 selects the signal channel that corresponds to the code or address defined by signal channel select signal 30. As a result, video cross point switch 24 outputs the electrical signals, indicated by reference number 32, that are on the selected signal channel. Electrical signals 32 are inputted into processing resource 16.

Referring to the FIGURE, processing resource 16 processes electrical signals 32 to determine if a video signal is present. If no video signal is present, then processing resource 16 processes the noise signals that are part of electrical signals 32 so as to generate noise characteristic data. Processing resource 16 uses this noise characteristic data to generate a new video signal threshold. This particular feature of apparatus 10 is further discussed in the ensuing description.

In a preferred embodiment, processing resource 16 comprises analog-to-digital converter (ADC) 40, first-in-first-out (FIFO) memory 42 and microcontroller 44. In one embodiment, microcontroller 44 is an Intel® 87FC251SB Microcontroller, although other suitable microcontroller chips can be used as well. Program instructions are loaded in non-volatile on-chip random access memory for operation of video cross-point switch 24, ADC 40, FIFO buffer 60 and DAC 68. Input clock 46 generates an input clock signal 48 that defines the sample rate for ADC 40 and functions as a write clock for FIFO memory 42. ADC 40 converts electrical signals 32 into digitized data signals 50. Therefore, if a video signal is present, ADC 40 converts the video signal into digitized data signals, and if no video signal is present, then ADC 40 converts the noise signals into digitized data signals. Digitized data signals 50 are inputted into FIFO memory 42. Due to the large video bandwidth, input clock signal 48 provides a relatively high sample rate for ADC 40 in order to avoid aliasing. In a preferred embodiment, input clock signal 48 is a 40 MHz clock signal. Input clock 46 and ADC 40 produce data 50 at a rate that is faster than the rate at which microcontroller 44 can process data. Microcontroller clock 52 outputs microcontroller clock signal 54 that controls the data rate of FIFO memory 42 and microcontroller 44. In one embodiment, microcontroller clock signal 54 is a 16 MHz clock signal. FIFO memory 42 outputs digitized data signals 60 at the clock rate defined by microcontroller clock signal 54. Therefore, digitized data signals 50 are written into FIFO memory 42 at the data rate of 40 MHz and are read by microcontroller 44 at a data rate of 16 MHz. Microcontroller 44 outputs FIFO control signal 58 that enables the flow of digitized data signals 60 to microcontroller 44.

Microcontroller 44 is programmed with an algorithm that effects processing of digitized data signals 60. This algorithm utilizes the video cross-point switch 24, the ADC 40, and the FIFO buffer 60 to select and sample the desired video signal channel. The sampled data is then analyzed to determine whether the sampled data represents the noise floor or a received video signal. If the sampled data represents the noise floor, the sampled data will fall within an expected range and contain some negative values. If the sampled data represents a received video signal, the sampled data will likely exceed the expected range of the noise floor and will not contain negative values. When sampled data does not exceed the expected range for the noise floor but does not contain negative values, the sampled data is discarded and new sampled data is then acquired. Once it is determined that sampled data represents the noise floor, the noise floor is characterized using statistical measures. Using the sampled data, microcontroller 44 calculates the mean, variance, and standard deviation of the noise floor. Since the noise from the video signal channel has a Gaussian or normal probability distribution, 99.99% of the noise floor is below five standard deviations of the mean. Microcontroller 44 then sets the channel threshold to five standard deviations above the mean plus an additional 3 dB to minimize the false alarm rate and achieve an acceptable probability of detection. This algorithm can be modified to accommodate video signal channels that generate noise with other probability distributions.

Thus, in accordance with the aforementioned algorithm, microcontroller 44 first determines if a video signal is present on the selected video channel. If microcontroller 44 determines that a video signal is present, microcontroller 44 outputs channel select signal 30 that controls video cross-point switch 24 to select a next signal channel for processing. If microcontroller 44 determines that no video signal is present, then microcontroller 44 characterizes the digitized noise signals 60, which represent the noise floor, using the statistical measures in order to generate a new threshold level for use with the particular signal channel being processed. Microcontroller 44 outputs a digital threshold signal 62 that represents the new video signal threshold level. Microcontroller 44 generates ADC control signal 61, which enables ADC 40, as well as digital-to-analog converter (DAC) control signal 64 and DAC clock signal 66. Processing resource 16 further comprises DAC 68 that receives digital threshold signal 62, DAC control signal 64 and DAC clock signal 66. DAC control signal 64 enables DAC 68.

DAC 68 comprises a plurality of outputs 70, 71, 72 and 73 that provide the new, analog threshold levels to comparator circuit 12. Thus, output 70 is electrically connected to the threshold input of the comparator (not shown) in comparator circuit 12 that corresponds to signal channel 17. Output 71 is electrically connected to the threshold input of the comparator circuit 12 that corresponds to signal channel 18. Output 72 is electrically connected to the threshold input of the comparator circuit 12 that corresponds to signal channel 19. Similarly, output 73 is electrically connected to the threshold input of the comparator circuit 12 that corresponds to signal channel 20. DAC 68 converts the new, digital threshold signal 62 into an analog signal and outputs this analog signal to an appropriate one of outputs 70, 71, 72 and 73.

Once the new threshold level is generated and provided to the appropriate threshold input in comparator circuit 12, microcontroller 44 increments the channel select signal 30 so that the next signal channel is processed. Thus, for example, if a new threshold level has been generated for use with signal channel 19, then microcontroller 44 increments channel select signal 30 so that signal channel 20 is the next signal channel to be processed by processing resource 16. This process is continually repeated while the receiver system or signal processing system is operating. Thus, each signal channel 17, 18, 19 and 20 is continuously and automatically monitored to determine if a new video signal threshold level is needed.

The present invention monitors multiple signal channels with the use of minimum hardware. The low component count of apparatus 10 reduces the power consumption, total physical size and manufacturing cost of apparatus 10. The use of FIFO 42 enables apparatus 10 to sample the signal channels at a high data rate while using a simple microcontroller 44 that operates at a relatively slower clock rate. The statistical calculation algorithms executed by microcontroller 44 can be optimized for a tradeoff between sensitivity and false alarm rate. Apparatus 10 can be easily configured to operate with more than four signal channels.

The foregoing description of the preferred embodiments of the invention has been presented for purposes of illustration and description only. It is neither intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An apparatus for adaptively generating video signal thresholds for a comparator circuit having a plurality of signal channels, comprising:
    input circuitry in electrical signal communication with the plurality of signal channels, said input circuitry comprising a selector circuit to select one signal channel of said plurality of signal channels for processing; and
    a processing resource having an input joined to process the electrical signals on the selected one signal channel to determine if a video signal is present and, if no video signal is present, to process noise signals on the selected one signal channel to generate a new video signal threshold, said processing resource having an output to provide the new video signal threshold to the comparator circuit corresponding to the selected signal channel.

2. The apparatus according to claim 1 wherein the selector circuit comprises a video cross-point switch.

3. The apparatus according to claim 1 wherein the processing resource further comprises control signal generator circuitry to generate a control signal that configures the selector circuit to select a particular signal channel for processing.

4. The apparatus according to claim 3 wherein said control signal generator circuitry comprises a controller circuit.

5. The apparatus according to claim 4 wherein the controller circuit generates control signals that select each signal channel in a sequential manner.

6. The apparatus according to claim 4 wherein said processing resource further comprises an analog-to-digital converter joined to digitize signals on the selected signal channels and to provide the digitized signals to said controller circuit.

7. The apparatus according to claim 6 wherein said processing resource further comprises a first-in-first-out buffer memory joined to receive digitized signals, store these digitized signals, and provide these stored digitized signals to said controller circuit in accordance with commands from said controller circuit.

8. The apparatus according to claim 7 wherein said controller circuit is configured to implement a statistical calculation algorithm on the digitized signals that represent noise signals on the selected signal channel so as to generate the new video signal threshold.

9. The apparatus according to claim 8 further comprising a digital-to-analog converter that converts the new video signal threshold into an analog threshold signal.

10. A method for adaptively generating video signal thresholds, comprising the steps of:
    providing a plurality of signal channels having electrical signals comprising video and noise signals;
    selecting one of the signal channels;
    processing the selected signal channel to determine if a video signal is present and if no video signal is present, processing the noise signals to generate a new video signal threshold; and
    providing the new video signal threshold corresponding to the selected signal channel.

11. The method according to claim 10 further comprising the step of selecting a next signal channel if the step of processing the selected signal channel determines that a video signal is present.

12. The method according to claim 11 wherein said step of selecting comprises selecting each signal channel sequentially.

13. The method according to claim 11 wherein said selecting, processing and providing steps are continuously repeated for all of said plurality of signal channels.

14. The method according to claim 10 wherein the step of processing the selected signal channel comprises digitizing the electrical signals to provide digitized signals.

15. The method according to claim 14 wherein the step of processing the selected signal channel further comprises the step of performing a statistical calculation algorithm on the digitized signals representing noise signals to determine is a video signal is present.

16. The method according to claim 10 further comprising the step of converting the new video threshold to an analog voltage.

* * * * *